July 8, 1958
B. H. COHEN
2,841,915
TROLLING SINKER
Filed April 1, 1955
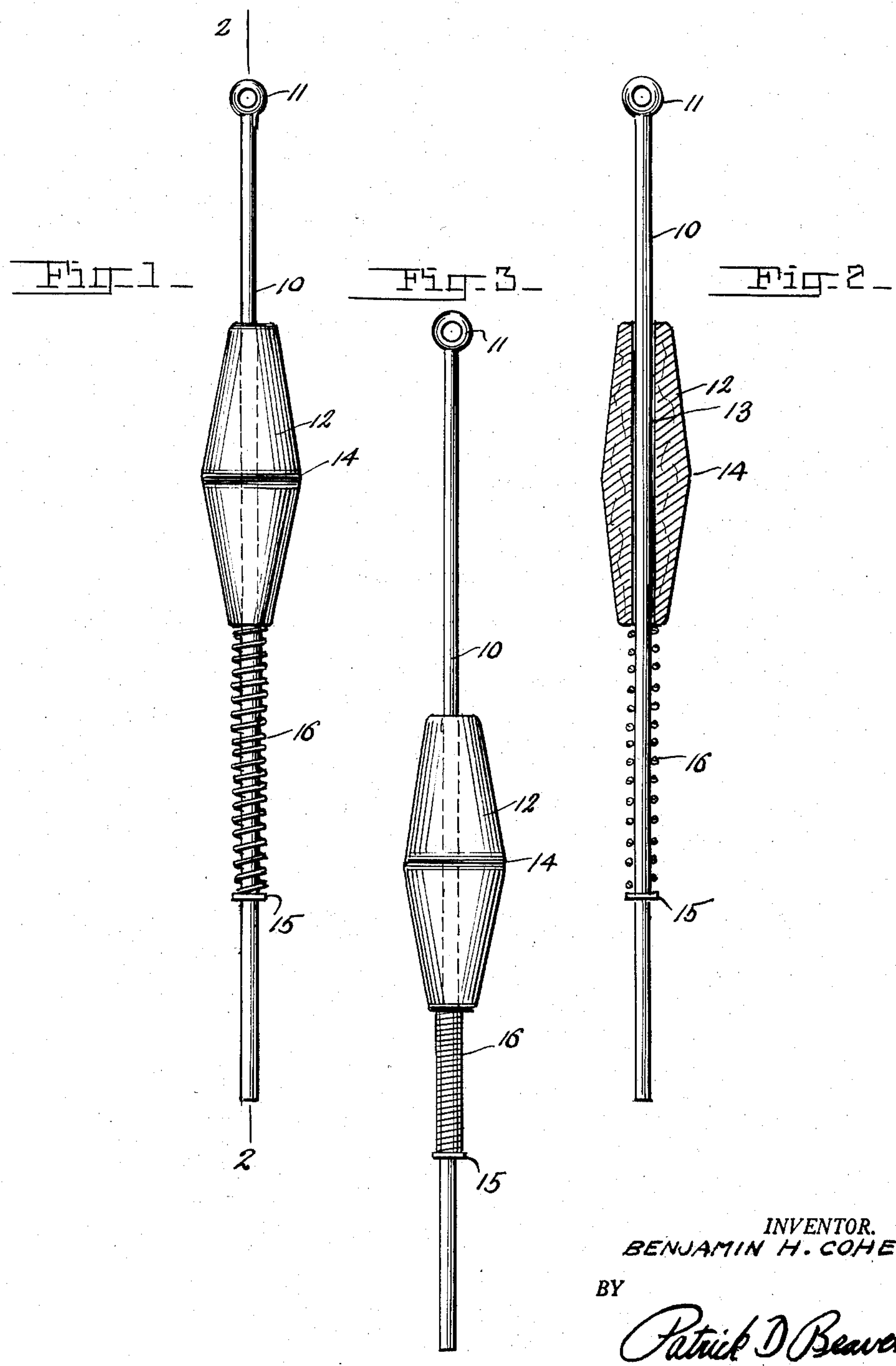
INVENTOR.
BENJAMIN H. COHEN
BY
Patrick D Beavers
ATTORNEY United States Patent Office 2,841,915

Patented July 8, 1958

1

2,841,915

TROLLING SINKER

Benjamin H. Cohen, Lorain, Ohio

Application April 1, 1955, Serial No. 498,601

1 Claim. (Cl. 43—42.72)

This invention relates to improvements in the art of fishing and more particularly to a trolling sinker.

The principal object of the present invention is to provide a sinker assembly especially adapted for use in trolling for fish, which is constructed in such a manner that it can be easily liberated from rocks and other objects against which it might be caught.

Another important object of the invention is to provide a spring mounted sinker, which by spring action can be easily liberated from obstacles against which it is caught while trolling for fish.

These and various other objects and advantages of the invention will become apparent to the reader of the following description.

In the drawing:

Figure 1 is a side elevational view of the sinker.

Figure 2 is a section taken substantially on line 2—2 of Figure 1.

Figure 3 is a side elevational view of the sinker showing the same in spring compressed position.

Referring to the drawing wherein like numerals designate like parts, it can be seen that numeral 10 denotes an elongated rod provided with a fishline attaching eye 11 at one end thereof.

Numeral 12 denotes an elongated sinker, preferably of lead and this sinker 12 has a longitudinally extending opening 13 therethrough for receiving the rod 10. Thus the sinker 12 is slidably disposed on the rod 10.

The sinker 12 is preferably tapered from a mid-point 14, outwardly toward each end thereof, so that the sinker

2 can readily ride over obstacles beneath the surface of the water being fished.

A cross pin 15 or other stop means is located adjacent the opposite end of the rod 10 and interposed between this pin or stop member 15 and the adjacent end of the sinker 12 is a coiled compression spring 16.

It can now be seen that during the act of trolling, the sinker 12 might catch against some obstacles such as a rock, with the result that the fishline is snapped. However, when the sinker, in the use of the present invention, catches against some obstruction, all that is necessary is to release the line quickly from the spring compressed position shown in Figure 3. This will readily and quickly develop space between the sinker and the obstacle, permitting the sinker to ride past the obstacle. In this manner the sinker is easily liberated from an obstacle.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A trolling sinker comprising an elongated rod provided with a fishing line attaching eye at one end thereof, a stop element fixed to the rod adjacent the other end of the same, a solid sinker formed with an opening longitudinally therethrough, said sinker having a medial portion of substantially greater diameter than the end portions of the sinker, with said sinker tapering from said medial point toward the ends thereof, said sinker being longitudinally slideable on the rod, and a compression spring located on said rod and interposed between said stop member and one end of the sinker, said spring being in alignment on the rod with the sinker.

References Cited in the file of this patent

UNITED STATES PATENTS

| | | |
|---|---|---|
| 84,885 | Leach | Dec. 15, 1868 |
| 883,048 | Pflueger | Mar. 24, 1908 |
| 1,444,876 | Hanson | Feb. 13, 1923 |
| 2,153,489 | Whitis | Apr. 4, 1939 |